R. WIKANDER.
ELECTROMAGNET AND ELECTRICALLY OPERATED SWITCH.
APPLICATION FILED MAR. 23, 1911.
1,175,323.
Patented Mar. 14, 1916.
2 SHEETS—SHEET 2.
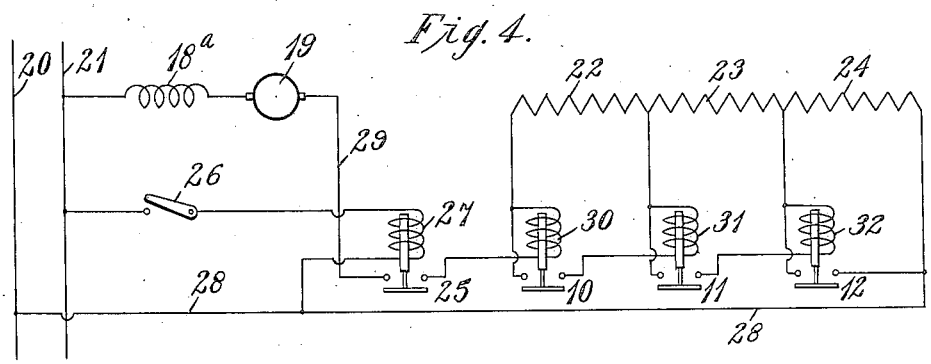
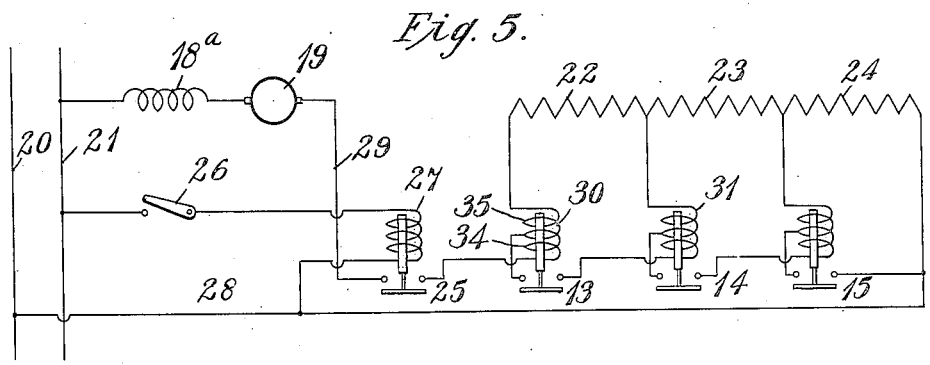
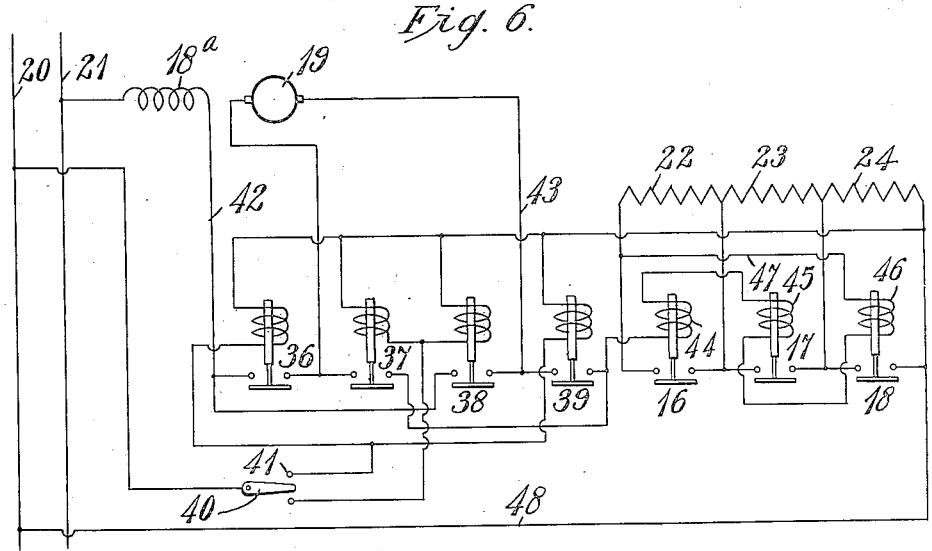

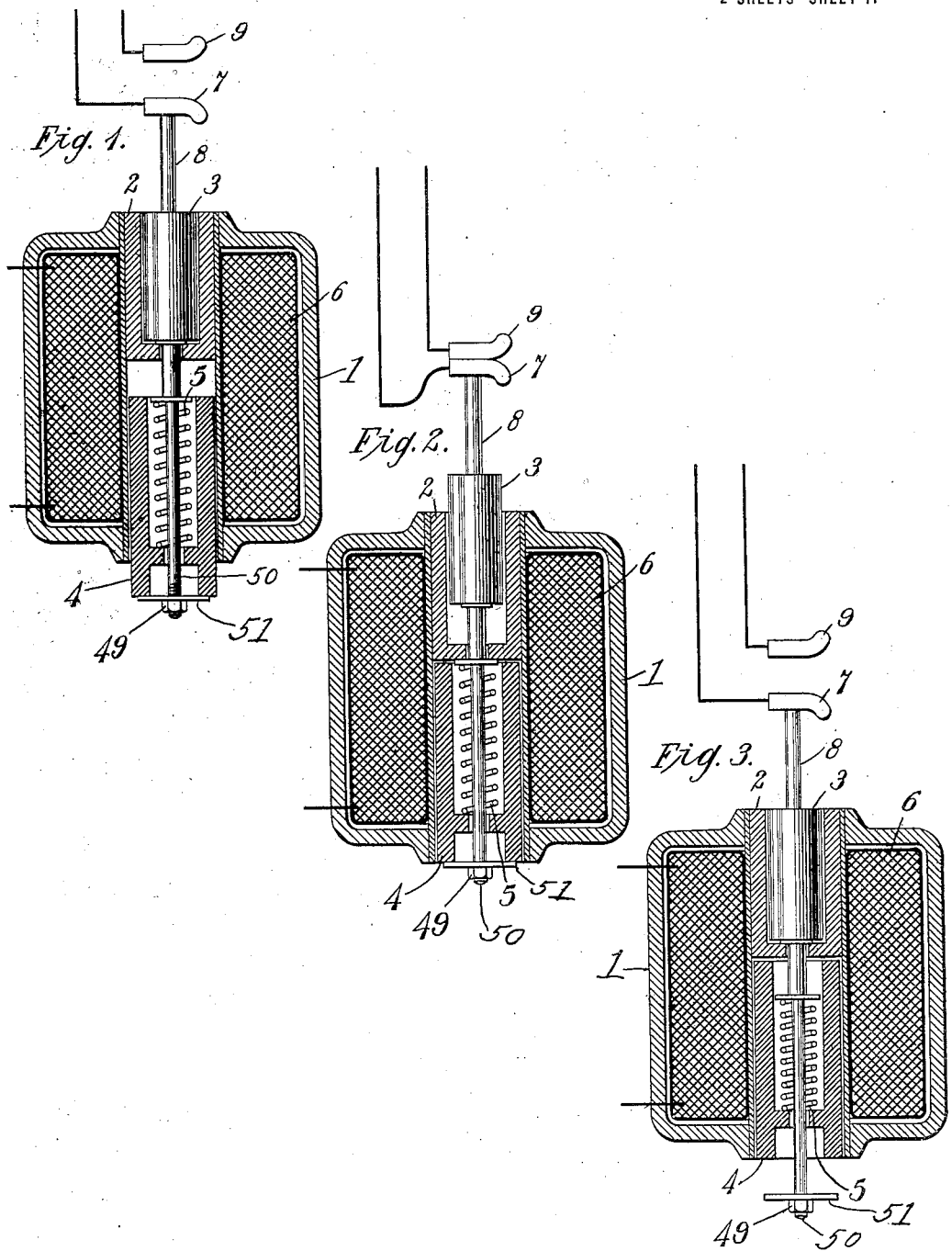

UNITED STATES PATENT OFFICE.

RAGNAR WIKANDER, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTROMAGNET AND ELECTRICALLY-OPERATED SWITCH.

1,175,323. Specification of Letters Patent. Patented Mar. 14, 1916.

Application filed March 23, 1911. Serial No. 616,479.

*To all whom it may concern:*

Be it known that I, RAGNAR WIKANDER, a subject of the King of Sweden and a resident of Pittsburgh, in the county of Allegheny and State of Pennsylvania, have invented a new and useful Improvement in Electromagnets and Electrically-Operated Switches, of which the following is a specification.

My invention relates to electro-magnets and particularly to such magnets as are adapted for actuating electric switching devices.

The object of my invention is to provide a simple device of the character above indicated that shall be positive in operation and be characterized by the property of operating only when the current supplied to the magnet coil, which constitutes a part of it, falls within predetermined limits.

For the control of electric motors, systems embodying a plurality of independently operated switches have been largely used, the several accelerating switches being interlocked to insure their operation in a predetermined sequence. I propose to materially simplify systems of this kind by providing switches that are permitted to close only when the current traversing the motor circuit falls below a predetermined value.

Figure 1 of the accompanying drawings is a sectional elevation of an electro-magnet constructed in accordance with my invention and applied to an electric switch. Figs. 2 and 3 are similar views of the same switch that respectively show the positions of the parts when the magnet coil is energized within predetermined limits and when the current traversing the coil exceeds a predetermined value. Figs. 4, 5 and 6 are diagrams showing the circuit connections of simple control systems provided with switches like that shown in the first three figures.

Referring to Figs. 1, 2 and 3, the electromagnet here shown is in the form of a solenoid of the armor clad type and comprises an outer casing 1, of magnetic material, which may be constructed in two or more parts for convenience in assembling. A hollow cylindrical member 2, also of magnetic material, projects axially into the casing 1. The member 2 is of such dimensions that it is saturated magnetically in advance of other elements with which it forms a magnetic circuit. The electromagnet comprises, also, movable core members 3 and 4, and a spring 5, which tends to separate the movable members, and a magnet coil 6. Relative movement of the core members 3 and 4 is limited by a rod or projection 50 with which the member 3 is provided and which extends through the bore of the hollow core member 4. The rod 50 is provided, at its outer end, with a washer 51 and an adjusting nut 49 for determining the amount of relative movement of the core members 3 and 4. A movable contact member 7 of a switch is operatively connected to the movable core member 3 by means of a rod 8 and is adapted to coöperate with a stationary contact member 9.

The operation of the switch is as follows: If a current of relatively large value traverses the coil 6, the parts are held in the positions shown in Fig. 3, in opposition to the spring 5, by reason of the magnetic flux through the core members 3 and 4, saturation of the stationary core member 2 serving a divert a relatively large flux through the movable member 3. As the current in the coil decreases, the flux in the movable member 3 decreases rapidly, while the flux in the member 2 decreases slowly, on account of its saturated condition, and, consequently, as soon as the current falls below a predetermined value, the spring 5 forces the movable member 3 and the switch contact 7 upward until the latter engages the stationary contact member 9, the parts being then located as indicated in Fig. 2.

The utility of the device will be apparent by reference to the diagrams of Figs. 4, 5 and 6, it being assumed that the switches 10, 11 and 12 of Fig. 4; 13, 14 and 15 of Fig. 5; and 16, 17 and 18 of Fig. 6, have the same operating characteristics as the switch shown in Figs. 1, 2 and 3.

In Fig. 4 an electric motor, having a field magnet winding 18ª and an armature 19, is first connected to a supply circuit 20—21 through resistance sections 22, 23 and 24 when line switch 25 is closed. A master switch 26 governs the supply of current to magnet coil 27 of line switch 25, a circuit being completed, when the master switch is closed, from conductor 21 through switch 26, magnet winding 27 and conductor 28 to conductor 20.

When the line switch is closed, the motor circuit is from conductor 21 through field winding 18ª, armature 19, conductor 29, line switch 25, magnet coil 30 of switch 10, resistance sections 22, 23 and 24 and conductor 28 to conductor 20.

In accordance with well known principles, a relatively large current will traverse the motor circuit when the line switch is first closed, and the switch 10 is so designed that it is held open by reason of the large current traversing its winding until the motor has acquired a predetermined speed and counter-electromotive force. As soon as this point is reached, the switch 10 is closed to establish a shunt circuit connection from the line switch 25, through the coil 30, the switch 10 and the magnet coil 31 of switch 11 in shunt to the resistance section 22. The resulting reduction in the total resistance of the armature circuit of the motor will produce another rush of current which will delay the closing of the switch 11. When switch 11 is finally closed, the resistance section 23 is shunted and the coil 32 of the switch 12 is included in the shunt circuit.

From the foregoing, it is evident that the switches 10, 11 and 12 will not only close in the proper sequence to cut out the resistance in the armature circuit section by section, but also that the closure of each switch will be sufficiently delayed to prevent injury to the motor and to provide a smooth acceleration.

In Fig. 5 the corresponding parts are designated by the same reference characters, and the operation of the switches 13, 14 and 15 is similar to that of the switches 10, 11 and 12, except that a portion of the winding of each of the switches is shunted with the resistance section when the switch is closed. For example: when the line switch 25 of Fig. 5 is closed, the coil 30 is included in the motor circuit as before, but when the switch 13 is closed, the motor circuit is then completed from the line switch through a portion 34 of the coil 30, the switch 13, coil 31, etc., as before, a second portion 35 of the coil 30 being shunted with the resistance section 22. By this arrangement, the number of turns permanently included in the motor circuit is reduced.

It is evidently possible to so proportion the magnet windings that the accelerating switches will be opened and the resistance reinserted if, after the motor is accelerated, the current traversing the motor circuit becomes excessive.

In the system of Fig. 6 the line switch of Figs. 4 and 5 is replaced by reversing switches 36, 37, 38 and 39, which are controlled in pairs by a master switch 40.

Assuming that master switch 40 is moved into engagement with a contact terminal 41, a circuit is established from conductor 21 through the coils of switches 36 and 39 in parallel and the conductor 48 to supply conductor 20. Switches 36 and 39 will thus be closed and current will flow from conductor 21, through motor field winding 18ª, conductor 42, switch 36, armature 19, conductor 43, switch 39, magnet windings 44, 45 and 46 of the switches 16, 17 and 18, conductor 47, resistance sections 22, 23 and 24 and conductor 48 to line conductor 20. Thus, all three of the magnet windings are connected in circuit in series relation. Under these conditions, it is necessary to independently adjust each of the switches so that the switch 16 will first close as the current is dying down after the motor is first connected in the circuit. A second rush of current will then occur and, by reason of the switch adjustment, switches 17 will next close and short circuit resistance section 23, the current in the motor circuit dying down to a somewhat lower value than was necessary for the closing of switch 16. After the second rush of current, the switch 18 will close, when the motor current has become sufficiently reduced.

The adjustment of the switches 16, 17 and 18, above referred to, may be effected by varying the tension of the spring 5 shown in Figs. 1, 2 and 3, which may be accomplished by adjusting nut 49 or by varying the number of turns of which the several coils are composed. I prefer, however, to make the switches identical in design and adjust the operation by varying the spring tension.

Variations in size and arrangement of parts may be effected in the electro-magnet illustrated, within the spirit and scope of my invention as defined in the appended claims, and the electro magnet may be used in any suitable relation, the control systems of Figs. 4, 5 and 6 being intended merely to illustrate the utility and adaptability of my invention.

I claim as my invention:

1. An electromagnetic switch comprising a stationary magnetizable member, two relatively movable core members, a single magnetizing winding for said core members, a spring tending to separate the movable core members, adjustable means for limiting the degree of separation between said core members, and means for deflecting a portion of the magnetic flux from one of said movable core members whereby relative movement of the core members is produced when the winding is energized below a predetermined degree only, a stationary contact member and a contact member connected to the said one core member and movable away from the stationary contact member upon movement of said one core member into the stationary magnetizable member.

2. An electromagnetic switch comprising a hollow cylindrical stationary magnetizable member having an inwardly projecting tubular axial portion, and a single magnetizing coil disposed within said stationary cylindrical member around the inwardly projecting portion, a movable core member operating axially within said tubular portion, a second independently movable core member, and a spring interposed between the movable core members, a stationary contact member and a contact member connected to the first named core member and movable away from the stationary contact member upon movement of said first named core member into the hollow magnetizable member.

3. An electro-magnet comprising a hollow cylindrical stationary magnetizable member having an inwardly extending hollow axial projection and having a perforated bottom forming a stop, a magnetizing coil disposed within said stationary cylindrical member and surrounding the projection, a hollow movable core member operating axially into and out of engagement with the projection of the stationary member, a second movable core member operating within the hollow projection of the stationary member and having a rod or projection extending through the hollow movable core member, an enlargement at the end of the projection of the movable core member for limiting the relative movement between the movable members, and a spring located within the hollow movable member around the projection and tending to separate the movable members.

4. An electromagnetic switch comprising a hollow cylindrical magnetizable member having a tubular portion, a magnetizing coil disposed within said cylindrical member, a core member axially movable within said tubular portion, an independently movable core member, and a spring interposed between said core members, said tubular portion serving to deflect a portion of the magnetic flux from the first named core member in order that it may be moved outwardly by said spring when the coil is energized below a predetermined degree only, a stationary contact member and a contact member connected to the first named core member and movable away from the stationary contact member upon movement of the first named core member into the hollow magnetizable member.

5. An electromagnetic switch comprising a hollow magnetizable member having an inwardly projecting tubular portion, a movable core member within said tubular portion, a second core movable longitudinally toward and away from said tubular portion, a resilient separating means interposed between said core members, and a magnetizing winding within said hollow member, said tubular portion serving to deflect a portion of the magnetic flux from the first named core member in order that it may be actuated by the second named core member through the interposed resilient means when the winding is magnetized below a predetermined degree only, a stationary contact member and a contact member connected to the first named core member and movable away from the stationary contact member upon movement of the first named core member into the hollow magnetizable member.

In testimony whereof, I have hereunto subscribed my name this 21st day of March, 1911.

RAGNAR WIKANDER.

Witnesses:
STANLEY STROUD,
B. B. HINES.